March 31, 1931.　　　L. J. CAMPBELL　　　1,798,928
HIGH SPEED CLUTCH FOR CHANGE SPEED TRANSMISSION
Filed Sept. 14, 1925　　　4 Sheets-Sheet 4
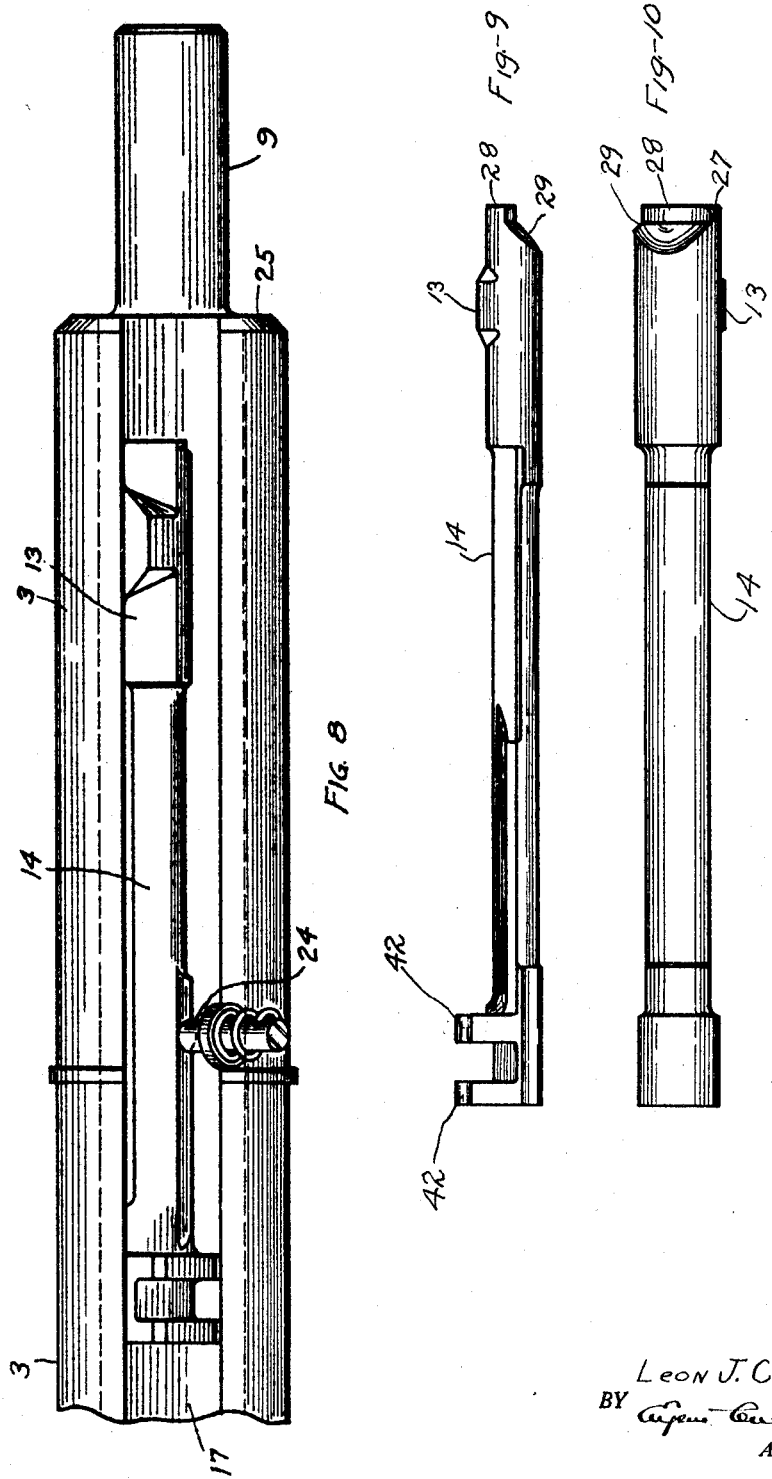
INVENTOR.
Leon J. Campbell
BY
ATTORNEY.

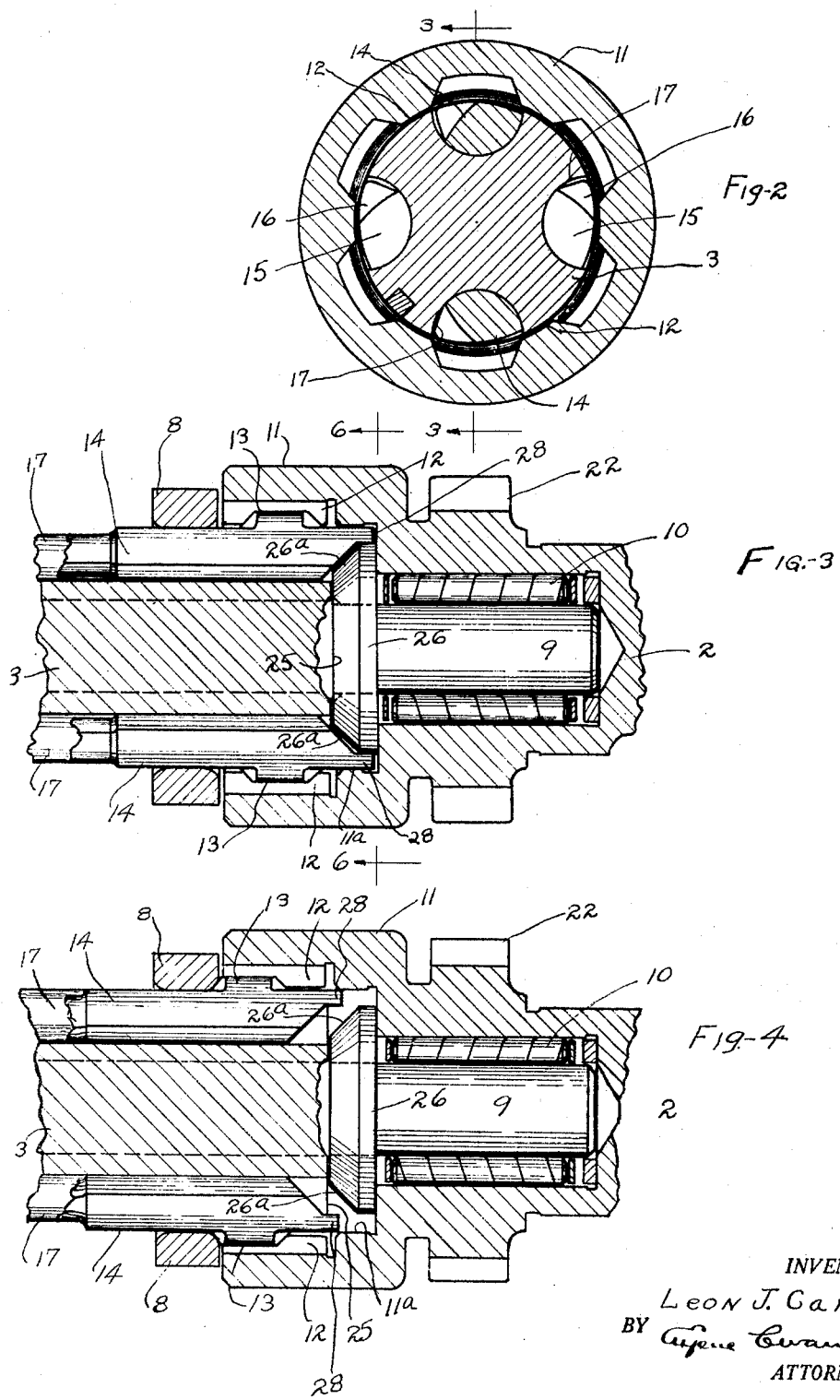

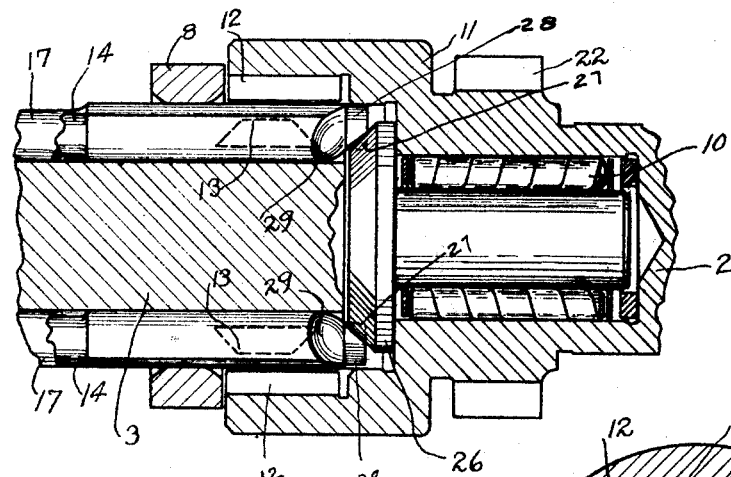
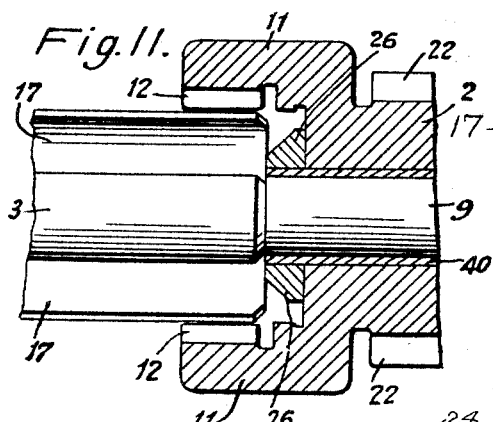
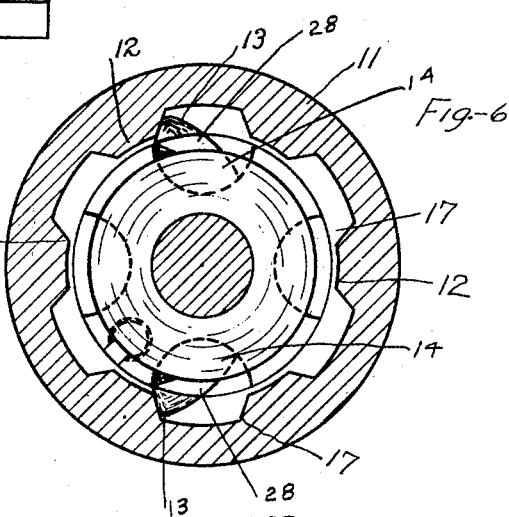
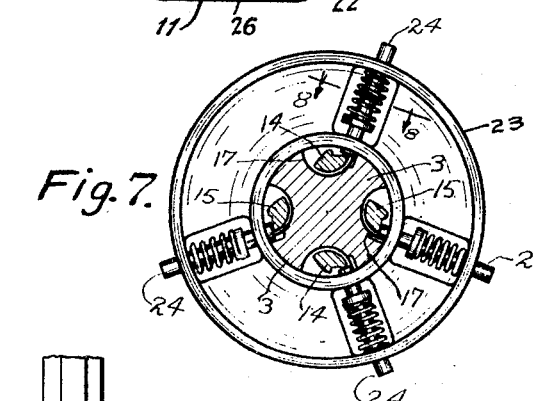
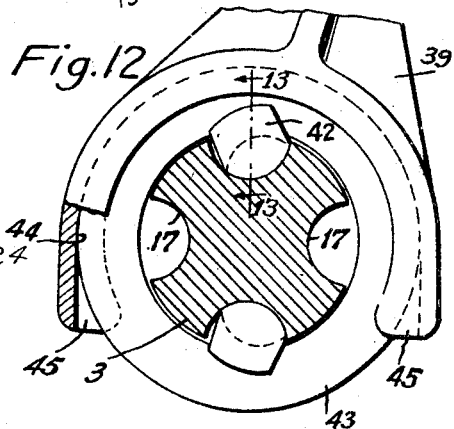
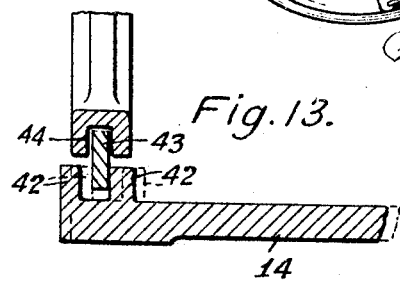

Patented Mar. 31, 1931

1,798,928

UNITED STATES PATENT OFFICE

LEON JAY CAMPBELL, OF BUCHANAN, MICHIGAN, ASSIGNOR, BY MESNE ASSIGNMENTS, TO THE STUDEBAKER CORPORATION, OF SOUTH BEND, INDIANA, A CORPORATION OF NEW JERSEY

HIGH-SPEED CLUTCH FOR CHANGE-SPEED TRANSMISSION

Application filed September 14, 1925. Serial No. 56,369.

This invention relates to a high speed clutch mechanism for use in automotive transmissions, and more particularly those in which slidable rockably mounted clutch keys are employed to select the speed changes afforded by the transmission.

One object of my present invention is to provide cam means in the path of movement of the high speed clutch keys and acting on the ends of the same for moving and holding said keys in clutched engagement with the high speed member.

Another object of my invention is to provide said means in the form of a collar surrounding the shaft so that said keys may be used interchangeably with any set of the grooves or keyways in the key carrying shaft.

A further object of my invention is to have the forward ends of these keys overlap or rest on the cam means for positively holding the keys in clutched engagement with said high speed member.

The invention consists further in the matters hereinafter described and claimed.

In the accompanying drawings—

Fig. 2 is an enlarged transverse vertical sectional view on line 2—2 of Fig. 1;

Fig. 3 is a longitudinal vertical sectional view on line 3—3 of Fig. 2, with the clutch keys directly connecting the driving and driven shafts together;

Fig. 4 is a similar view with parts broken away, showing the position of a clutch key on being first withdrawn from the cone-collar;

Fig. 5 is a similar view showing the clutch key riding up on the cone;

Fig. 6 is a vertical sectional view on line 6—6 of Fig. 3;

Fig. 7 is a vertical sectional view on line 7—7 of Fig. 1;

Fig. 8 is a longitudinal view on line 8—8 of Fig. 7; with the plunger cage omitted for the sake of illustration;

Figs. 9 and 10 are perspective views from the side and bottom, respectively, of one of said clutch keys;

Fig. 11 is a view of a modified form of construction;

Fig. 12 is a vertical sectional view on line 12—12 of Fig. 1; and

Fig. 13 is a vertical sectional view on line 13—13 of Fig. 12.

Figure 1:
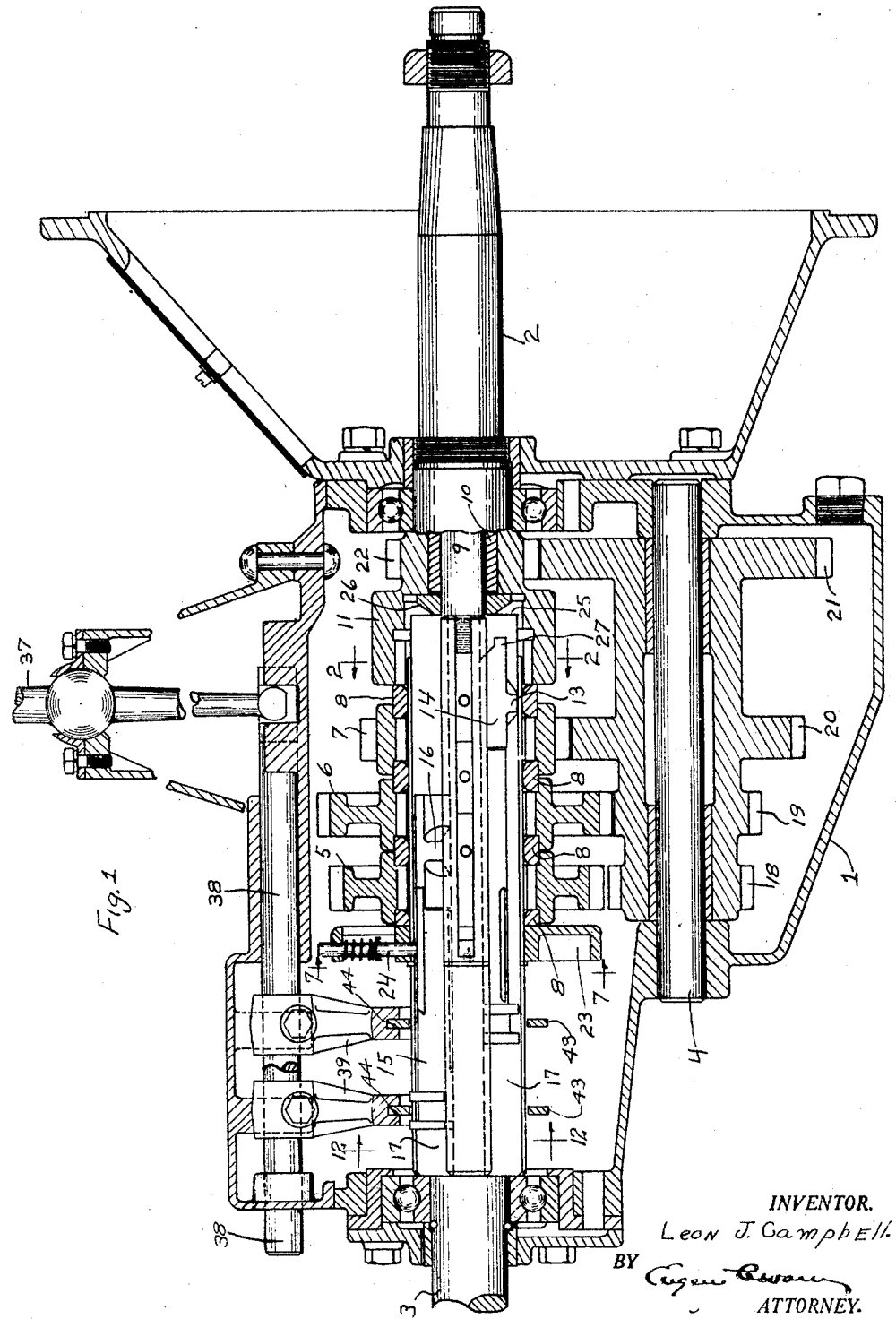
Fig. 1 is a longitudinal vertical sectional view through a change speed transmission embodying the features of my invention.

In the drawings, 1 indicates the outside casing or housing of the transmission, and 2, 3 and 4 indicate the driving, driven, and lay shafts, respectively. The driving and driven shafts 2, 3 are aligned and extend out of the case at the opposite ends thereof for connection with the clutch and propeller shaft, respectively, as in transmission design.

Gears 5, 6, and 7 of different diameters are loosely mounted on the driven shaft 3. These gears run on spacing and supporting rings 8, 8. The shaft 3 has a reduced forward end 9 which extends into a bore or recess in the rear end of shaft 2, there being a roller bearing 10 between the parts, as shown in Fig. 1.

Shaft 2 has its rear end enlarged into an annular member 11, which surrounds the adjacent unreduced portion of the shaft 3. This member 11 is spaced radially outward from the shaft 3 substantially the same distance as the gears 5 to 7. The member 11, as best shown in Figs. 2 and 6, has a plurality of internal abutments or shoulders 12, 12 circumferentially spaced apart and between which are spaces to receive the lugs 13 on a pair of clutch keys 14, 14 for directly connecting the shafts 2 and 3 together for third or high speed through the member 11. These keys also serve to connect the intermediate or second speed gear 7 to the shaft 3.

The gears 5 and 6 for reverse and low or first speeds, respectively, are selectively connected to the shaft 3 by a pair of clutch keys 15, 15 having lugs 16 for said gears, as shown in Fig. 1. The gears 5 to 7 for the lugs of their respective keys have the same arrangement of internal abutments and spaces as the member 11. The keys 14, 15 are slidably mounted in grooves or key-ways 17, 17 which extend longitudinally of the shaft 3 beneath the gears, rings, and member 11, as shown, The keys 14 of one set are longer than the keys 15 of the other seat, so that both sets of keys have substantially the same amount of endwise movement to reach their respective gears and member 11.

Spooled gears 18, 19, 20 and 21 of different diameters are loosely mounted on the lay shaft 4. Gears 19 and 20 are constantly in mesh with gears 6 and 7, while gear 21 is in constant mesh with a gear 22 carried by the shaft 2 at the member 11. This gives the member 11 the effect of a gear for high speed for the shaft 3, and, like gears 5 to 7, is a rotary member surrounding shaft 3. The gears 5 and 18 are in constant mesh with a reverse idler (not shown) as in transmissions of this general design.

Keys 14 and 15 are rockably mounted in their grooves or key-ways 17 and the lugs 13, 16 are on one side of the longitudinal axes of their respective keys, as shown in Figs. 6 and 8. An annular cage 23 is fixed to the shaft 3 at the rear ends of the keys 14, 15 and carries spring pressed plungers 24, 24, as shown in Figs. 1 and 7. These plungers 24 bear inward against the keys on the sides of their axes opposite the lugs 13, 16 for rocking the keys in a direction to project their lugs beyond the periphery of the shaft 3 for locking thereto the gears 5 to 7 and 11 when the keys are slid endwise to free their lugs of the rings 8. The lugs 13 and 16 have inclined or cam shaped ends to engage the rounded inner edges of the rings 8 for rocking the lugs down under the rings to release the gears from the shaft on drawing the lugs under said rings, as shown in Fig. 1.

As shown in Figs. 1, 3, and 4, the shaft 3 at its reduced end has a forwardly facing shoulder 25. The grooves or keyways 17 open through this shoulder. A collar 26 surrounds the reduced portion 9 of the shaft 3 in front of this shoulder and is held against the same by the member 11. The collar 26 has an inclined or cam face 26ª opposite said shoulder and this face extends outward beyond the bottoms of the grooves or keyways 17 so as to be in the path of endwise movement of the long keys 14, 14.

This cam 26ª, when the forward ends of the keys 14, 14 are moved endwise against the same, causes the keys to be positively moved in a direction to force their lugs 13 into the spaces between the abutments of the member 11 and lock or clutch the same to the shaft 3, thereby directly connecting shafts 2 and 3 together for direct drive or high speed. This action is not dependent on the plungers 24, and as a result the lugs 13 are forced manually into a tight fit with the abutments 12, so that there is no looseness or lash in the connection. To promote ease of action for the keys, the forward ends thereof in line with the lugs 13 are beveled off at their corners, as at 27 in Fig. 10.

The keys 14 have their forward ends undercut to provide projections 28, one on each key, as shown in Figs. 3 to 5 and 9 and 10. These projections 28 are brought to rest on or overlap the outer cylindrical surface of the collar 26 at the outer edge of the cam 26ª in the final movement of the key into clutched engagement with the member 11 and hold the keys in locked engagement with said member 11. Each projection 28 has its under surface shaped to conform to the outer cylindrical surface of the collar 26 so as to seat thereon, as shown in Fig. 6. The end of each key beneath the projection is inclined to conform to the cam surface 26ª so as to seat against the same and reduce the length of the projection 28 to avoid weakening the key.

The collar 26 must be spaced forward of the front ring 8 a distance sufficient to allow the projectons 28 of the keys to be moved off of and free of the collar in order that the lugs 13 may be turned down under the ring 8 to release the member 11 from the shaft 3, as shown in Fig. 4. The collar 26 in surrounding the shaft 3 provides a cam for each of the four grooves or keyways 17, 17, so that the keys 14 may be used in any two of the grooves. This allows the keys to be interchanged with the grooves so that the continuous wear may be taken off one set of grooves. Moreover, in assembling the transmission the workmen are not required to select any particular set of grooves for the long keys 14 for cams are associated with all the grooves.

The clutch keys 14, 15 are shifted endwise of the shaft 3 by a hand shift lever 37, which extends out of the case 1 to within reach of the driver of the car as in transmission design. This lever co-operates with pull rods 38, 38 which by yokes 39, 39 engage the keys 14, 15, as shown in Fig. 1.

As shown in Figs. 1 and 3, the member 11 has an annular shoulder 11ª about the collar 26 and providing a space to receive the forward projections 28 on the keys 14, 14 when the latter connect shafts 2 and 3. These projections engage under this shoulder and are held thereby from further turning. As shown in the drawing the forward ring 8 and shoulder 11ª have substantially the same internal diameter and in engaging the associated keys 14, 14 on their outer peripheries on opposite sides of their lugs 13 support the keys from rising out of their grooves or keyways under torque strains thereon when the keys are in clutched engagement with the high speed member 11.

Instead of having the collar 26 carried directly by the shaft 3, I may have the collar carried by the shaft 2 and thus be maintained in concentric relation with the gear member 11 to hold the keys 14 tightly engaged with the member 11 even though the shaft 2 may work out of true axial alignment with the shaft 3. In Fig. 11 I have shown a bushing 40 pressed tight into the bore or recess of shaft 2. The collar 26 is mounted on this bushing and is maintained thereby in concentric relation to the member 11.

Each key 14, 15 has a pair of outwardly projecting lugs 42, 42 at its rear end. The lugs of each pair are spaced apart and receive a ring 43 which surrounds the shaft 3. The rings are received edgewise in grooves 44, 44 in the associated yokes 39, as shown in Fig. 12, for connecting the keys to the yokes. These yokes extend over more than half the circumference of the rings and have their grooves terminate in straight portions 45, 45 for slipping the yokes over the rings on assembling the parts.

As shown by dotted lines in Fig 13, the spacing of the lugs 42, 42 is greater than the thickness of the associated ring 43, so that the power taking hold on the key as its locking lug frees the ring 8 will automatically move the key endwise without the aid of the ring to effect quick clutching of the key to the gear.

The details of construction and arrangement of parts shown and described may be variously changed and modified without departing from the spirit and scope of my invention. While I have shown the cam abutments for the clutch keys in the form of a collar 26, it is of course to be understood that the abutments could be otherwise made and arranged and still be within the spirit and scope of my invention.

I claim as my invention:

1. In combination with a shaft having a longitudinal groove therein, a rotary member surrounding said shaft, a key slidably mounted in said groove and having a lug adjacent one end, and an abutment in the path of movement of the key and having an inclined surface for moving the lug end of the key into clutched engagement with said member, said key being held in engagement with said member by having the end of the key beyond the lug overlapping the outer surface of the abutment beyond the latter's inclined surface.

2. In combination with a shaft having a longitudinal groove therein, a rotary member and a ring surrounding said shaft, a key slidably mounted in said groove and having a lug at one end, spring means acting on the key for moving its lug into clutched engagement with said member when the lug is free of said ring, and abutment means in the path of movement of the key and extending above the bottom of the groove for positively moving and holding the lug of the key in engagement with said member by acting on the end of the key beyond its lug.

3. In combination with a shaft having a longitudinal groove therein, a rotary member and a ring surrounding said shaft, a key slidably mounted in said groove and having a lug at one end, spring means acting on the key for moving its lug into clutched engagement with said member when the lug is free of said ring, and abutment means in the path of movement of the key for positively moving and holding the key in engagement with said member by acting on the end of the key beyond its lug, said ring and abutment being spaced far enough apart lengthwise of the shaft for the end of the key to free the abutment before its lug engages said ring.

4. In combination with a shaft having a longitudinal groove therein, a rotary member surrounding said shaft, a key slidably and rockably mounted in said groove, and abutment means in the path of movement of said key and extending upward from the bottom of the groove for rocking and holding the key in clutched engagement with said member.

5. In combination with a shaft having a longitudinal groove therein, a rotary member surrounding said shaft, a key slidably and rockably mounted in said groove, and having a lug on one side thereof, spring means acting on the other side of the key for moving the lug into clutched engagement with said member, and abutment means in the path of movement of said key and acting on the lug side of the key for positively rocking and holding the key in engagement with said member.

6. In combination with a shaft having a longitudinal groove therein, a rotary member surrounding said shaft, a key slidably and rockably mounted in said groove and having a lug at one end, and an abutment in the path of movement of the key and having an inclined surface for rocking the lug into clutched engagement with said member, the lug end of the key being undercut to provide a projection to overlap the abutment and hold the lug engaged with said member.

7. In combination with a shaft having a plurality of longitudinal grooves therein, a rotary member surrounding said shaft, a plurality of keys slidably mounted in said grooves, and a collar about the shaft at the ends of said grooves and being in the path of movement of said keys for moving and holding the same in clutched engagement with said member.

8. In combination with a shaft with a reduced end to provide a shoulder and having longitudinal grooves opening through said shoulder, a rotary member about said shaft and having a portion in front of said shoulder, keys slidably mounted in said grooves, and a collar about the shaft between said member and shoulder for holding the keys in clutched engagement with said member, said collar having an inclined surface in the path of movement of the keys for moving the same into engagement with said member.

9. In combination with a shaft having longitudinal grooves therein, a rotary member surrounding said shaft, keys slidably mounted in said grooves, and a collar in the path of movement of said keys at the ends of the grooves and maintained in concentric relation to said member for moving and holding the keys in clutched engagement with said member.

10. In combination with aligned driving and driven shafts, the latter having longitudinal grooves therein and having a reduced end entering the driving shaft, keys in said grooves, a rotary member carried by the driving shaft and surrounding the driven shaft, a bushing about the reduced end of the driven shaft and carried by said driving shaft, and a collar carried by said bushing at the ends of the grooves for moving and holding the keys in clutched engagement with said member.

11. The combination with aligned driving and driven shafts, of a rotary member carried by the driving shaft and surrounding the driven shaft, keys slidably mounted on the driven shaft, and means carried by the driving shaft for supporting the ends of the keys in concentric relation thereto when the keys are in clutched engagement with said member.

12. In combination with a shaft having a longitudinal groove therein, of a rotary member supported by said shaft and surrounding same and having a shoulder, a ring on said shaft at one side of said rotary member and having an internal diameter approximately that of said shoulder, a key slidably mounted in said groove and having a lug, said key being supported on opposite sides of the lug by the ring and the shoulder, respectively, when the lug of the key is in clutched engagement with said member.

13. In combination with a shaft having a plurality of longitudinal grooves therein, a rotary member surrounding said shaft, a key slidably mounted in one of said grooves for connecting and disconnecting the rotary member to and from said shaft, and abutment means in the path of movement of the key for moving and holding the same into clutched engagement with said rotary member, said abutment means being within the periphery of the shaft and extending upward from the bottoms of all of the grooves so that said key may be used in any of the grooves.

In testimony whereof I affix my signature this 10th day of September, 1925.

LEON JAY CAMPBELL.